United States Patent [19]

Smith

[11] 4,335,796
[45] Jun. 22, 1982

[54] PTO REAR MOUNTING

[75] Inventor: Frank R. Smith, Mayville City, Wis.

[73] Assignee: Deere & Company, Moline, Ill.

[21] Appl. No.: 185,840

[22] Filed: Sep. 11, 1980

[51] Int. Cl.$^3$ .............................................. B60K 25/06
[52] U.S. Cl. ................................. 180/53 D; 94/15.66
[58] Field of Search ............... 180/53 D, 53 R; 74/11, 74/15.66, 15.86, 15.88

[56] References Cited

U.S. PATENT DOCUMENTS

| | | | |
|---|---|---|---|
| 2,438,539 | 3/1948 | Cook | 74/11 |
| 2,624,416 | 1/1953 | Larsen | 180/53 R |
| 2,679,769 | 6/1954 | Parrett | 180/53 R |
| 3,122,025 | 2/1964 | Mark | 74/11 |
| 3,404,572 | 10/1968 | Hungerford | 74/15.84 |

Primary Examiner—Joseph F. Peters, Jr.
Assistant Examiner—Donn McGiehan

[57] ABSTRACT

A lawn and garden-size tractor including a transmission having a PTO output shaft and a drive shaft. The drive shaft is coupled to a differential gearing arrangement located in a transverse axle casing. The transverse axle casing has geared shafts oriented in relationship to one another to allow the axle casing to assume a posture whereby a PTO system may be mounted thereto such that the PTO tube location will be in compliance with ASAE standards without increasing the height of the rear portion of the tractor. The posture of the transverse axle casing further allows the inclusion in the PTO system of a gear reducing arrangement to bring the PTO output in compliance with the ASAE standard of 2000 revolutions per minute (RPM).

4 Claims, 6 Drawing Figures

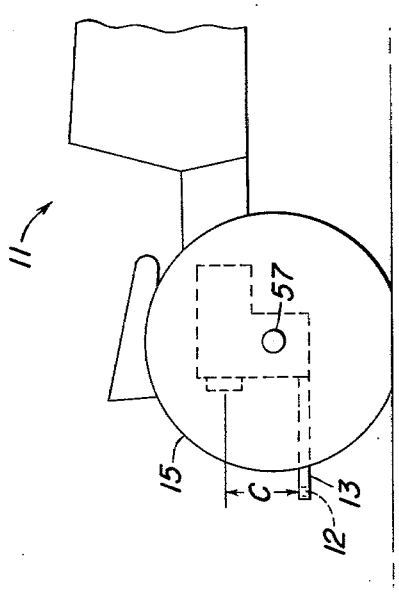
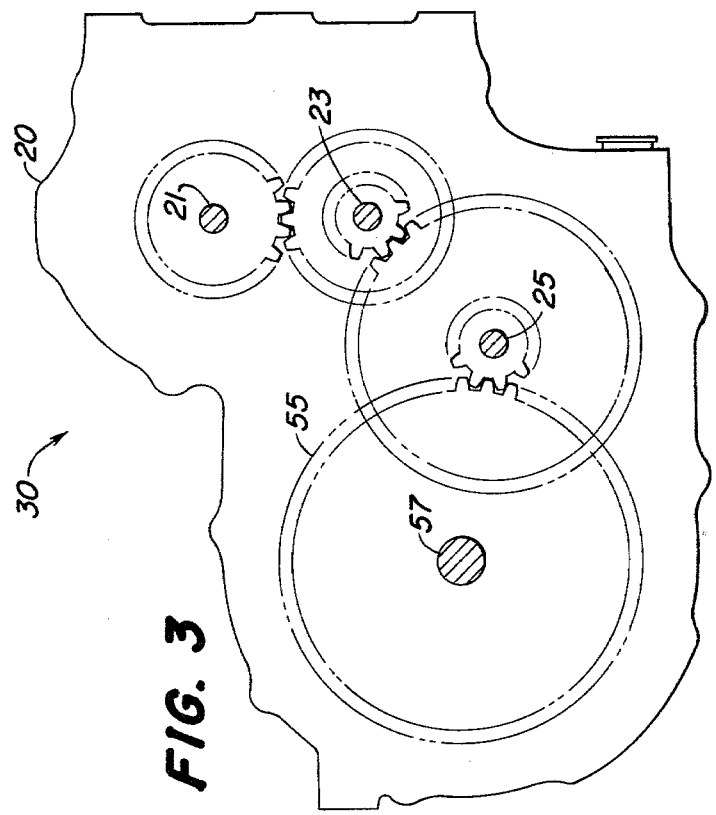
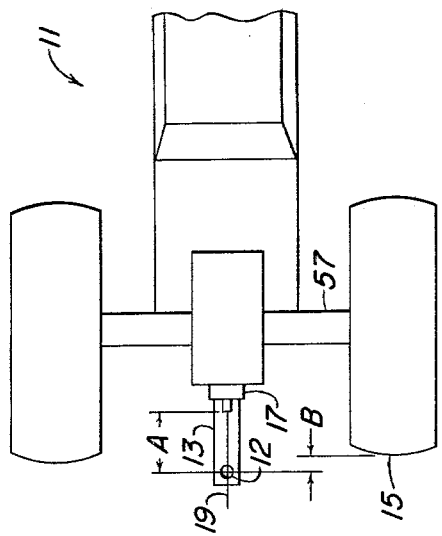
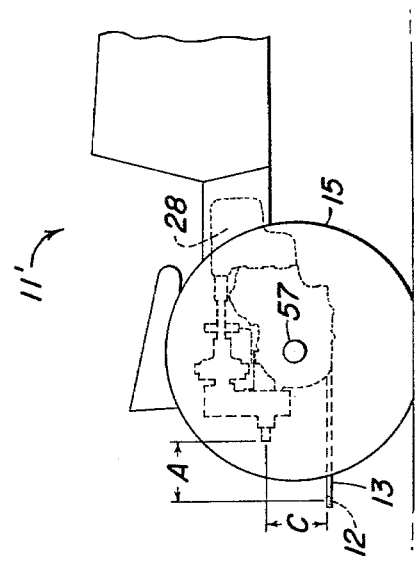

PTO REAR MOUNTING

BACKGROUND OF THE INVENTION

This invention relates to power take-off systems for tractors and, more particularly, power take-off systems for lawn and garden-size tractors.

A rear mounted power take-off (PTO) on lawn and garden-size tractors will permit the use of additional rear implements. In recognition of the increased interest in the ability of lawn and garden tractors to accommodate implement attachment, the American Society of Agricultural Engineers (ASAE) has promulgated standards relating to the location of a PTO output tube (ASAE: S370.1T). These standards are intended to allow the interchange of implements among different makes of lawn and garden tractors. However, because of spacial constraints relative to the overall tractor, lawn and garden manufacturers either do not provide PTO systems on the tractor or provide PTO systems having an output tube which is in non-standard locations.

SUMMARY OF THE INVENTION

It is therefore an objective of the present invention to provide a PTO system for a lawn and garden-size tractor which is in compliance with the standards as promulgated by the American Society of Agricultural Engineers (S370.1T). It is a further object of the present invention to provide a PTO system which is not integral to the tractor, thereby allowing the option of the inclusion of a PTO system.

A lawn and garden-size tractor including a transmission having a PTO output shaft and a drive shaft. The drive shaft is coupled to a differential gearing arrangement located in a transverse axle casing. The transverse axle casing has geared shafts oriented in relationship to one another to allow the axle casing to assume a posture whereby a PTO system may be mounted thereto such that the PTO tube location will be in compliance with ASAE standards without increasing the height of the rear portion of the tractor. The posture of the transverse axle casing further allows the inclusion in the PTO System of a gear reducing arrangement to bring the PTO output in compliance with the ASAE standard of 2000 revolutions per minute (RPM).

BRIEF DESCRIPTON OF THE DRAWINGS

FIG. 1a schematically shows the relative horizontal location of the PTO output tube located in accordance with ASAE standards.

FIG. 1b schematically shows the relative vertical location of a PTO output tube located in accordance with ASAE standards.

FIG. 2 is a sectional view of the drive gearing out of true position in the transverse axle casing.

FIG. 3 schematically shows a tranverse axle casing generally in compliance with the present invention.

FIG. 4 is a sectional view of the mounting location of the PTO shaft, clutch and reducing gear in compliance with the present invention.

FIG. 5 schematically shows a lawn and garden-size tractor having a transverse axle and PTO system in accordance with the present invention.

DETAILED DESCRIPTION OF THE PREFERRED EMBODIMENT

Figure 2:
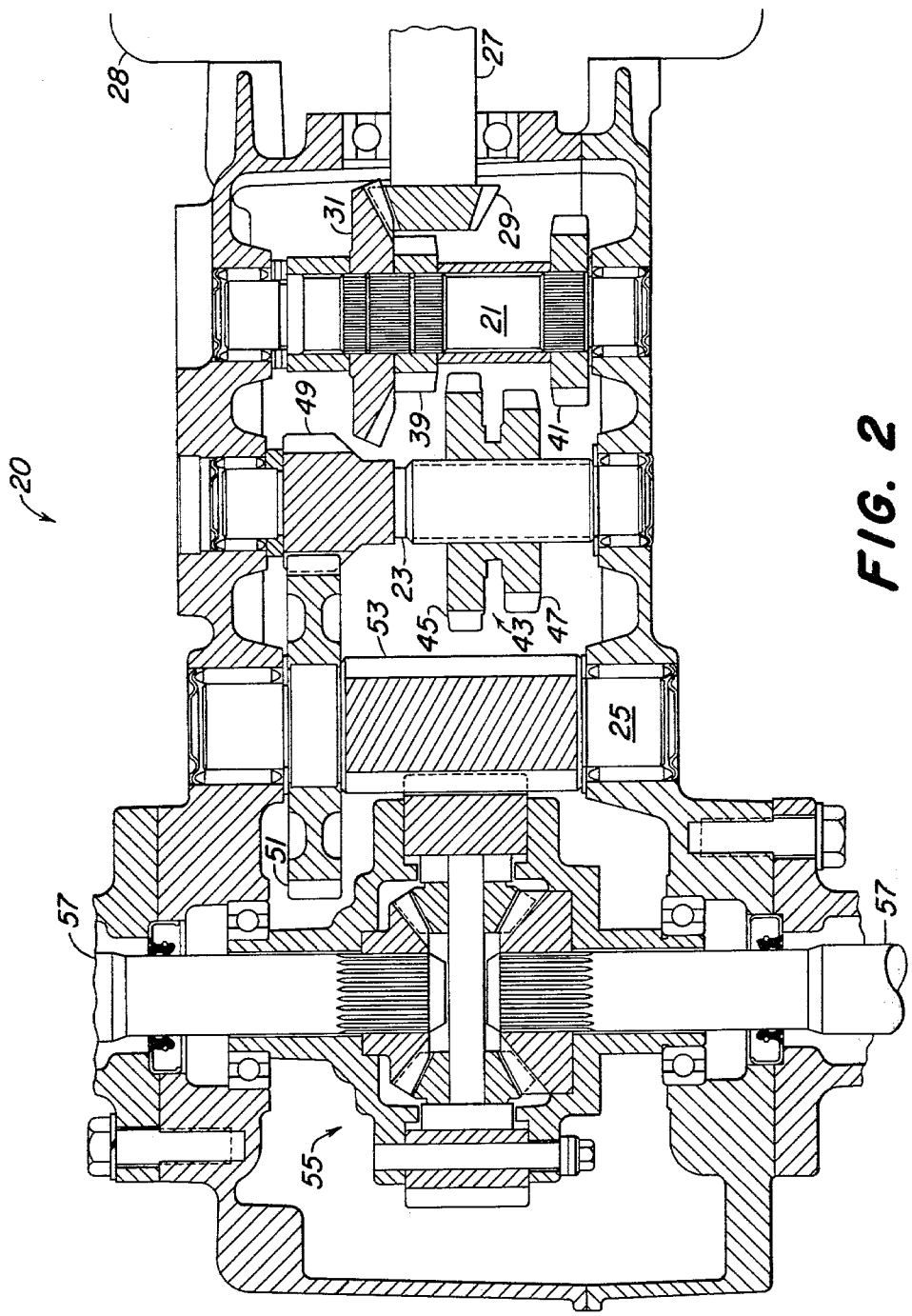

Referring to FIGS. 1a and 1b, there is schematically shown the rear portion of a lawn and garden-size tractor 11. The ASAE standards (ASAE: S370.1T) set for a lawn and garden-size tractor requires the horizontal distance "B" between the hitch point 12 on the tractor drawbar 13 and the radius of the largest outside diameter tire 15 specified for use by a tractor manufacturer should be 4 inches plus or minus 4 inches rearward of the tire 15 radius. The horizontal distance "A" between the hitch point 12 on the tractor drawbar 13 and the end of a splined tube 17 of a PTO system should be 11 inches. The vertical distance "C" between the top of the draw bar 13 at the hitch point 12 and the center line of the PTO tube 17 should be 6 inches plus or minus 1 inch. In addition, the location of the PTO tube 17 should be within the limits of 1 inch to the right or left of the center line 19 of the tractor, tractor center line being the recommended location. The PTO tube 17 is specified to be driven at a rate of 2000 RPM.

Referring to FIG. 2, a vehicle transverse axle casing 20 is shown including a plurality of shafts 21, 23 and 25 rotatably mounted by any conventional means in the casing 20 (shafts 21, 23 and 25 are shown out of their true positions for the purpose of clarity). A drive shaft 27 initiating from the vehicle transmission 28 having bevel gear 29 is in constant mesh with bevel gear 31 fixably mounted around shaft 21, shaft 21 being rotatably mounted transversely by any conventional means in casing 20. Spaced apart and fixably mounted by any conventional means around shaft 21 is a low gear 39 and a high gear 41. Slidably mounted on and placed around shaft 23 by any conventional means is a double gear 43 such that rotation of gear 43 causes rotation of shaft 23. Gear 43 is comprised of a gear 45 which can assume a meshed relationship with gear 39 and a gear 47 which can assume a meshed relationship with gear 41. In the preferred embodiment, gear 43 is shiftable by any conventional means to provide a two speed final drive. Also fixably mounted around shaft 23 by any conventional means is a gear 49.

Fixably mounted by any conventional means around shaft 25 is a gear 51 in constant mesh with gear 49, shaft 25 being rotatably maintained in the casing 20 by any conventional means. Also fixably mounted by any conventional means around shaft 25 is a gear 53 in constant mesh with a conventional differential pinion gear arrangement 55 for the rotation of wheel shafts 57 rotatably maintained in casing 20 by any conventional means. The wheel shafts 57 are in driving communication with vehicle wheel 15 in a conventional manner.

The true vertical relative positions of shafts 21, 23, 25, and wheel shafts 57 in casing 20 are shown in FIG. 3. It is observed, that shafts 21, 23 and 25 are oriented parallel to each other and transversely aligned within casing 20. Colinearly aligned wheel shafts 57 also have a transverse alignment parallel to shafts 21, 23 and 27. Shaft 23 is placed vertically directly downward shaft 21. Shaft 25 is placed vertically downward and horizontally to the left-hand side of shaft 23. Shafts 57 are placed generally vertically between shafts 23 and 25, and horizontally to the left-hand side of shaft 25, thereby allowing the transverse axles differential casing 20 to assume a configuration as indicated whereby a mounting recess 30 is formed in the rear portion of casing 20.

Figure 4:
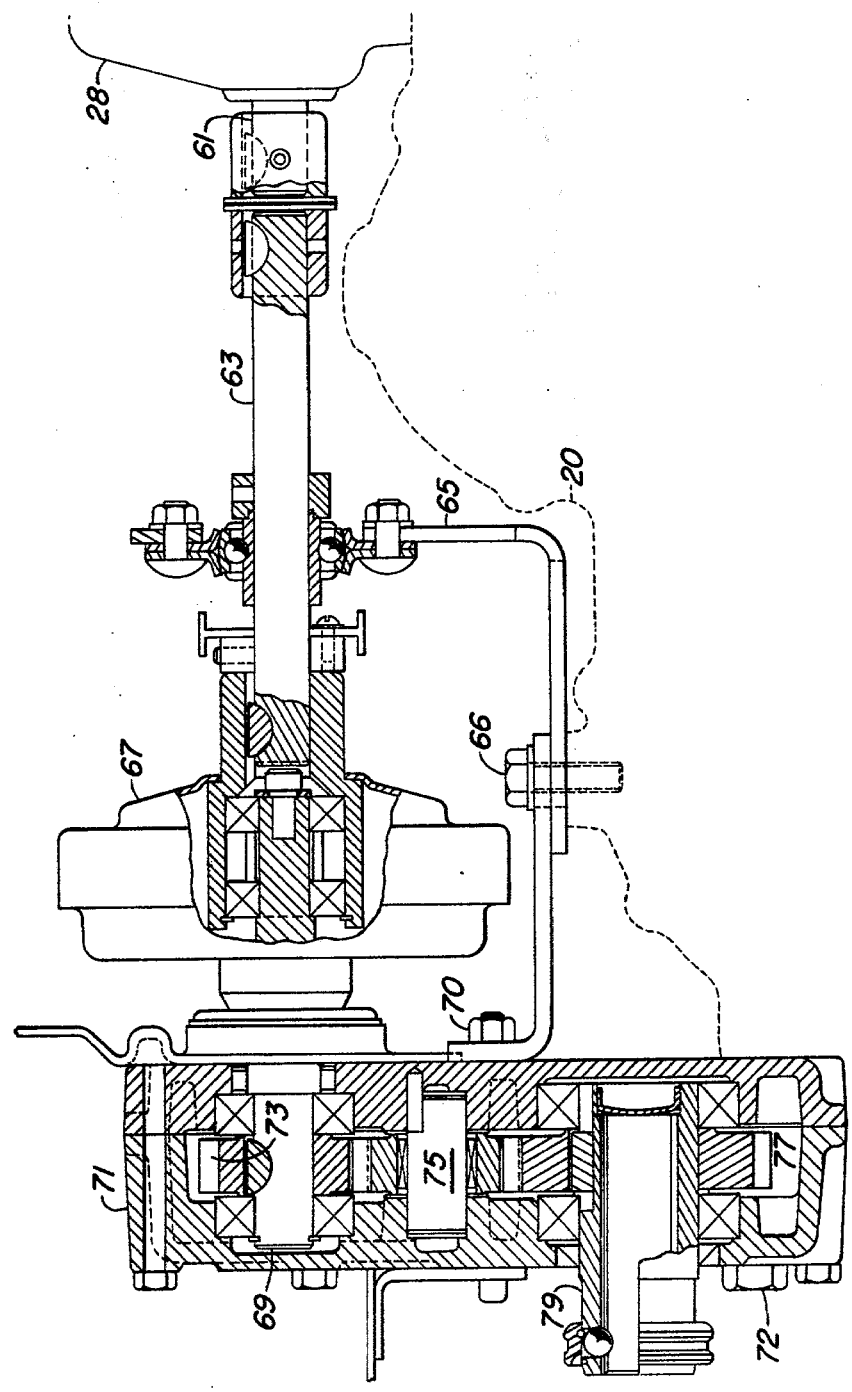

Referring to FIG. 4, in the preferred embodiment, a hydrostatic transmission, particularly shown and indicated as 28, has an output PTO drive shaft 61 detachably coupled by any conventional means to the PTO shaft 63. The PTO shaft 63 is rotatably supported by a generally U-shaped support member 65 which in turn is fixably and detachably mounted by any conventional means such as by bolt 66 within the mounting recess 30 formed by casing 20. The PTO shaft 63 is received by a conventional electric clutch 67 in the preferred embodiment, which clutch 67 is rotatably supported by any conventional means by support member 65. An output clutch shaft 69 extends into and is rotatably supported within by any conventional means, a reducing gear housing 71 fixably and detachably mounted by any conventional means, such as bolt 70, to support member 65 and the rear face of casing 20, such as by bolt 72. Within the gear housing 71 fixably mounted around shaft 69 by any conventional means is a gear 73. Gear 73 is in constant mesh with an idler gear arrangement 75 rotatably supported within the gear housing 71 by any conventional means. Idler gear 75 in turn is in constant mesh with a gear 77, which is fixably mounted around a PTO tube 79 by any conventional means. The PTO tube 79 is rotatably supported within the housing 71 by any conventional means having one end extending therefrom.

Referring to FIGS. 3 and 5, it is observed that the relative positions of shafts 21, 23, 25 and 57, allow the transverse axle casing 20 to assume a vertical configuration to permit the fitting of the PTO shaft 63, clutch 67 and housing 71 to be securely mounted in a detachable manner to the rear portion of casing 20 such that the overall height of the rear portion of the vehicle is not altered, allowing the PTO tube location to be in compliance with ASAE standards as afore-enumerated. The gears 73, 75 and 77 in gear housing 71 permit the PTO tube 79 to be rotated at the 2000 RPM set by the ASAE.

I claim:

1. In combination with a lawn and garden-size tractor including a transmission, a transmission output shaft in communication with the differential section of a transverse axle, said differential section located centrally along the longitudinal center line of said tractor, said differential sections being housed in a casing and including a plurality of geared shafts extending parallel and transversely within said casing communicating said transmission with said differential gear arrangement within said casing, said transmission having a PTO drive shaft extending therefrom, wherein the improvement comprises: a first of said geared shafts in driven communication with said transmission output shaft, a second geared shaft to be placed vertically downward of said first geared shaft, said differential gear arrangement to be horizontally removed towards the rear of said casing to allow said casing to form a recess in the rear portion of said casing; a PTO coupled to said PTO drive shaft; support means for rotatably supporting said PTO shaft, said support means being detachably mounted in said recess; gear reducing means including a PTO output tube in driven communication with said PTO shaft and detachably mounted to the back of said casing for controlling the output of said PTO tube, said PTO tube being located centrally along the longitudinal center line of said tractor for providing output rotational rate of said PTO different from the rotational rate of said PTO shaft.

2. A tractor as claimed in claim 1 further including clutching means interrupting said PTO shaft for selectively coupling and uncoupling said PTO drive shaft to said PTO shaft.

3. In combination with a tractor having a transmission, a transmission output shaft in communication with the differential section of a transverse axle, said differential section located centrally along the longitudinal center line of said tractor, said differential section being housed in a casing and including a plurality of geared shafts communicating said transmission with a differential gear arrangmenet within said casing, said transmission having a PTO drive shaft extending therefrom, wherein the improvement comprises: a first of said geared shafts in driven communication with said transmission output shaft; a second of said geared shafts in driven communication with said first geared shaft; a third of said geared shafts in driven communication with said second geared shaft; a differential gear arrangement in driven communication with said third geared shaft, said differential gear arrangement including a plurality of colinearly aligned wheel shafts extending therefrom, said first geared shaft extending transversely within said casing, said second geared shaft extending parallel to said first geared shaft in said casing and located vertically below said first geared shaft, said third geared shaft extending parallel to said second geared shaft and located vertically below said second geared shaft, said differential gear arrangement is placed such that said wheel shafts extend generally parallel to said third geared shaft and communicate with said third geared shaft such that said casing can assume a low profile having a step recess in said casing located horizontally just beyond said first geared shaft covered by said casing; a generally U-shaped mount having opposing side walls detachably mounted to said casing in said recess; a PTO shaft coupled to said PTO drive shaft and rotatably mounted in one of said side walls; a PTO gear reducing assembly mounted to the back of said casing having a PTO tube located generally along the center line of said tractor; and clutching means for selectively communicating said PTO shaft with said PTO gear reducing assembly whereby said low profile casing permits the PTO tube location to comply with ASAE:S370.1T.

4. A tractor as claimed in claim 2 wherein said clutching means is an electric clutch assembly.

* * * * *

UNITED STATES PATENT AND TRADEMARK OFFICE
CERTIFICATE OF CORRECTION

PATENT NO. : 4,335,796

DATED : June 22, 1982

INVENTOR(S) : Frank R. Smith

It is certified that error appears in the above-identified patent and that said Letters Patent is hereby corrected as shown below:

Column 3, line 57, after "PTO", (first occurrence)

insert -- shaft --.

Signed and Sealed this

Twenty-first Day of December 1982

[SEAL]

Attest:

GERALD J. MOSSINGHOFF

Attesting Officer

Commissioner of Patents and Trademarks